(No Model.)
T. A. EDISON.
MANUFACTURE OF CARBON CONDUCTORS.
No. 354,310. Patented Dec. 14, 1886.
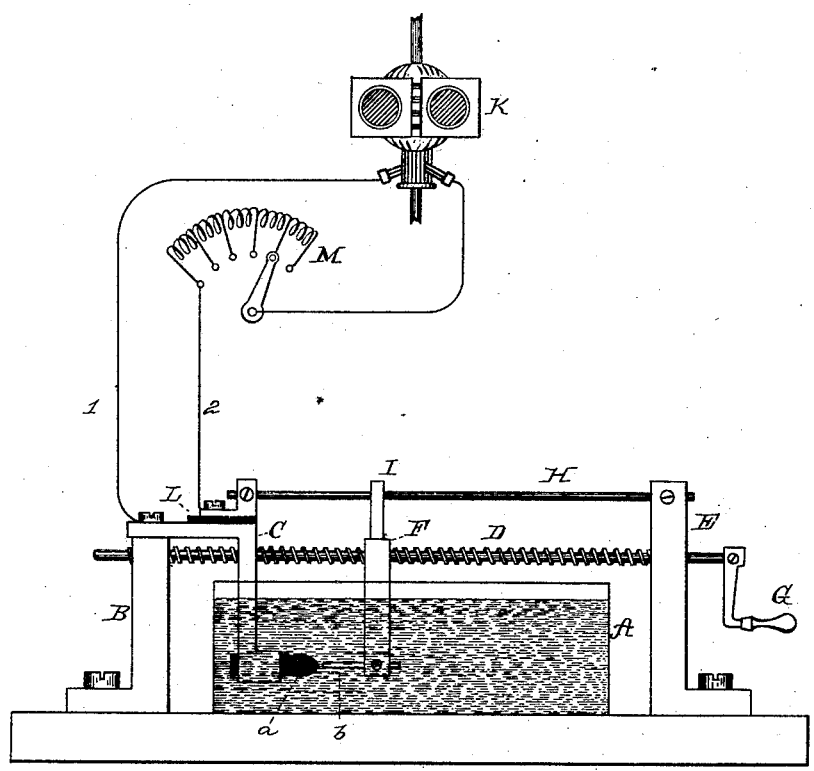
ATTEST:
E. C. Rowland
H. W. Seely
INVENTOR:
Thomas A. Edison
By Rich'd N. Dyer,
Atty

UNITED STATES PATENT OFFICE.

THOMAS A. EDISON, OF MENLO PARK, NEW JERSEY.

MANUFACTURE OF CARBON CONDUCTORS.

SPECIFICATION forming part of Letters Patent No. 354,310, dated December 14, 1886.

Application filed April 17, 1883. Serial No. 91,953. (No specimens.)

*To all whom it may concern:*

Be it known that I, THOMAS A. EDISON, of Menlo Park, in the county of Middlesex and State of New Jersey, have invented a new and useful Improvement in the Manufacture of Carbon Conductors, (Case No. 556,) of which the following is a specification.

The object of this invention is to produce flexible filaments for incandescing conductors for electric lamps of pure and dense carbon by an artificial process and without the carbonizing of fibrous or other material. By the use of such conductors lamps of high candle-power can be produced. I accomplish this by establishing a voltaic arc between two electrodes immersed in a liquid or gaseous compound of carbon decomposable by heat. One of the electrodes must consist of a piece of carbon, while the other should be a rod or wire of metal, carbon, or any conducting material of small area. Carbon from the liquid or gas will be deposited upon the end of the latter electrode, and said electrode is gradually drawn away as this gradual deposit proceeds, the normal length of the arc being thus maintained.

The negative electrode is preferably of such area that a fine filament is formed. This may be made of any length, and is of such flexibility that it may, if desired, be bent into loops or horseshoe form.

Enlarged ends for clamping may be formed upon this stick by depositing carbon in any suitable manner.

My invention may be carried into effect by the apparatus illustrated in the annexed drawing.

A is a tank or vessel containing a hydrocarbon oil or other liquid carbon compound capable of being decomposed by heat.

A standard, B, supports the arm C, which holds the carbon electrode *a* immersed in the liquid. A screw-threaded rod, D, is supported by the standards B and E, and carries an arm, F, which supports the electrode *b*, which is preferably a small platinum rod, but may be of any metal or conducting material. A handle, G, is provided for turning the screw. A guide-rod, H, extends from one standard to the other, and a guide-fork, I, passes along said rod to keep the electrode in position. The wires 1 2 extend to the electrodes from the poles of a dynamo-electric machine, K; or any other suitable electric generator may be employed.

L is a section of insulating material for preventing a short circuit. An adjustable resistance, M, may be provided for regulating the current supplied to the electrodes.

When the current is set up and the arc established, the heat thereof decomposes the liquid in the vessel, and carbon is deposited upon the electrode *b*.

The screw is turned and the electrode *b* is gradually withdrawn. A thin stick or filament of carbon is thus formed, which, when it has attained the desired length, is broken off from the platinum electrode. Enlarged clamping ends may then be formed upon it in any suitable manner. The carbon thus produced is of a very pure, dense, and homogeneous structure, and is flexible and very suitable for the purpose mentioned.

Instead of the trough containing a hydrocarbon liquid, a vessel may be used through which a decomposable gas is passed, the mechanism for moving the electrode being actuated by a rod passing into the vessel through a stuffing-box.

Instead of the screw motion shown, any suitable automatic mechanism—such as is employed in voltaic-arc lamps—may be employed to maintain a constant arc.

It is evident that by using suitable mechanism for moving the electrode spirals or other shapes of deposited carbon can be formed, and by using electrodes of different areas sticks of different sizes may be produced.

I do not claim herein the product resulting from the process described, this application being limited to the process alone. The product thereof is reserved for a separate application. Neither do I claim herein the above-described apparatus for carrying out my process; but I reserve this also for separate application.

What I claim is—

1. The process of forming incandescing conductors for electric lamps, consisting in decomposing a carbon compound by heat and causing the carbon set free to deposit in the required form without any axial cone or support.

2. The process of producing carbon sticks or filaments, consisting in establishing a voltaic arc between two electrodes immersed in a liquid or gaseous carbon compound decomposable by heat and maintaining a constant length of the arc, substantially as set forth.

3. The process of producing carbon sticks or filaments, consisting in establishing an arc between a carbon electrode and another electrode immersed in a liquid or gaseous carbon compound decomposable by heat, and gradually removing one electrode away from the other as the stick or filament increases in length by the deposited carbon, substantially as set forth.

This specification signed and witnessed this 6th day of April, 1883.

THOS. A. EDISON.

Witnesses:
H. W. SEELEY,
EDWARD H. PYATT.